US006940613B1

(12) United States Patent
Beard et al.

(10) Patent No.: US 6,940,613 B1
(45) **Date of Patent: *Sep. 6, 2005**

(54) SYSTEM FOR MANAGING REPLACEABLE MODULES IN A DIGITAL PRINTING APPARATUS

(75) Inventors: Michael E. Beard, Webster, NY (US); Roger W. Budnik, Rochester, NY (US); James M. Pacer, Webster, NY (US); Guru B. Raj, Fairport, NY (US); Ralph A. Shoemaker, Rochester, NY (US); Michael G. Swales, Sodus, NY (US); David E. Rollins, Lyons, NY (US); Porfirio J. Perez, Walworth, NY (US); Ameet S. Bhattacharya, Rochester, NY (US); David P. Vanbortel, Macedon, NY (US); Steven E. Kolb, Estero, FL (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,307

(22) Filed: Nov. 25, 1997

Related U.S. Application Data

(60) Provisional application No. 60/043,579, filed on Apr. 11, 1997.

(51) Int. Cl.[7] .......................... G06K 15/00; G03G 15/00

(52) U.S. Cl. ....................... 358/1.13; 358/1.15; 358/1.9; 399/8; 399/9; 399/12; 399/106

(58) Field of Search ................................ 395/114, 112; 399/24, 26, 8, 9, 11, 12, 13, 25, 27, 31, 101, 106, 110, 111, 121, 262, 311; 358/1.13, 1.15, 1.9, 1.16

(56) References Cited

U.S. PATENT DOCUMENTS

| | | | | |
|---|---|---|---|---|
| 4,372,675 | A | 2/1983 | Sahay | 355/14 FU |
| 4,585,327 | A | 4/1986 | Suzuki | 355/3 R |

(Continued)

FOREIGN PATENT DOCUMENTS

| | | | |
|---|---|---|---|
| EP | 0 301 544 | A2 | 2/1989 |
| EP | 0 393 627 | A | 10/1990 |
| EP | 0 532 308 | A | 3/1993 |
| EP | 0 721 171 | A2 | 7/1996 |
| GB | 2234467 | A | 2/1991 |
| GB | 2 302 309 | A | 1/1997 |
| JP | 03153280 | | 7/1991 |

OTHER PUBLICATIONS

Effectively Non–refillable Copier or Printer Cartridge Xerox Disclosure Journal (vol. 18, No. 2, Mar./Apr. 1993).

(Continued)

*Primary Examiner*—King Y. Poon
(74) *Attorney, Agent, or Firm*—R. Hutter

(57) ABSTRACT

An electrophotographic printing or copying machine includes a functional module which can be readily removed and replaced by service personnel. The module includes a monitor in the form of an electronically-readable memory, which includes information about how the particular module is to be operated. A distribution board electronically accesses the memories within the monitors and reads therefrom information, such as how much voltage to supply to different components within each module. The distribution board can also update the number of prints made with each module, and maintain this count within the monitors.

22 Claims, 1 Drawing Sheet

U.S. PATENT DOCUMENTS

| | | | | | |
|---|---|---|---|---|---|
| 4,586,147 | A | | 4/1986 | Tadokoro | 364/550 |
| 4,634,258 | A | | 1/1987 | Tanaka et al. | 355/4 |
| 4,751,484 | A | | 6/1988 | Matsumoto et al. | 355/14 CU |
| 4,774,544 | A | | 9/1988 | Tsuchiya et al. | 355/14 C |
| 4,804,980 | A | * | 2/1989 | Snelling | 347/123 |
| 4,851,875 | A | * | 7/1989 | Tanimoto | 399/24 |
| 4,870,459 | A | * | 9/1989 | Ito et al. | 399/10 |
| 4,961,088 | A | | 10/1990 | Gilliland et al. | 355/206 |
| 5,049,898 | A | | 9/1991 | Arthur et al. | 346/1.1 |
| 5,101,233 | A | * | 3/1992 | Ito et al. | 399/24 |
| 5,173,733 | A | * | 12/1992 | Green | 399/26 |
| 5,200,779 | A | * | 4/1993 | Nawata | 399/24 |
| 5,208,626 | A | * | 5/1993 | Tanimoto et al. | 399/111 |
| 5,216,464 | A | * | 6/1993 | Kotani et al. | 399/24 |
| 5,260,750 | A | * | 11/1993 | Ishida et al. | 355/260 |
| 5,272,503 | A | | 12/1993 | LeSueur et al. | 355/208 |
| 5,283,613 | A | | 2/1994 | Midgley, Sr. | 355/203 |
| 5,289,210 | A | | 2/1994 | Takyanagi | 346/140 R |
| 5,318,370 | A | | 6/1994 | Nehowig | 400/613 |
| 5,428,378 | A | | 6/1995 | Murata et al. | 347/19 |
| 5,452,059 | A | | 9/1995 | Sekiya | 355/210 |
| 5,489,971 | A | | 2/1996 | Nam | 355/208 |
| 5,491,540 | A | | 2/1996 | Hirst | 355/200 |
| 5,512,988 | A | | 4/1996 | Donaldson | 355/260 |
| 5,517,282 | A | * | 5/1996 | Yamashita et al. | 399/10 |
| 5,537,194 | A | * | 7/1996 | Henry et al. | 355/271 |
| 5,548,374 | A | | 8/1996 | Iguchi et al. | 355/200 |
| 5,572,292 | A | | 11/1996 | Chatani et al. | 399/25 |
| 5,579,088 | A | | 11/1996 | Ko | 355/203 |
| 5,596,416 | A | * | 1/1997 | Barry et al. | 358/401 |
| 5,636,032 | A | | 6/1997 | Springett | 358/296 |
| 5,673,190 | A | * | 9/1997 | Kahleck et al. | 364/131 |
| 5,708,912 | A | | 1/1998 | Lee | 399/24 |
| 5,717,974 | A | | 2/1998 | Park | 399/24 |
| 5,800,081 | A | * | 9/1998 | Teradaira et al. | 400/74 |

OTHER PUBLICATIONS

"CRUM Activated 'No Warranty' Display" Xerox Disclosure Journal (vol. 19, No. 5, Sep./Oct. 1994).
"Intelligent Paper Cassette," Xerox Disclosure Journal (vol. 18, No. 5, Sep./Oct. 1993, p. 519).
"Pulse Width Modulator" product specification—Rev. 0 from Analog Devices (1996).
"Document Centre 265 Digital Copier Specifications"—Xerox Corporation (1997).

* cited by examiner

SYSTEM FOR MANAGING REPLACEABLE MODULES IN A DIGITAL PRINTING APPARATUS

CLAIM OF PRIORITY FROM US PROVISIONAL APPLICATION

The present application claims priority from U.S. Provisional Patent Application No. 60/043,579, filed Apr. 11, 1997.

INCORPORATION BY REFERENCE

The following US patents, all assigned to the assignee hereof, are hereby incorporated by reference for the teachings therein: U.S. Pat. No. 4,961,088; 5,173,733; 5,636,032.

FIELD OF THE INVENTION

The present invention relates to a system for controlling replaceable modules, also known as "customer replaceable units" or CRUs, in a digital printing apparatus, such as a digital electrophotographic printer/copier.

BACKGROUND OF THE INVENTION

In the office equipment industry, different customers have different requirements as to their business relationship with the manufacturer of the equipment or other service provider. For various reasons, some customers may wish to own their equipment, such as copiers and printers, outright, and take full responsibility for maintaining and servicing the equipment. At the other extreme, some customers may wish to have a "hands off" approach to their equipment, wherein the equipment is leased, and the manufacturer or service provider takes the entire responsibility of keeping the equipment maintained. In such a "hands off" situation, the customer may not even want to know the details about when the equipment is being serviced, and further it is likely that the manufacturer or service provider will want to know fairly far in advance when maintenance is necessary for the equipment, so as to minimize "down time." Other business relationships between the "owning" and "leasing" extremes may be imagined, such as a customer owning the equipment but engaging the manufacturer or service provider to maintain the equipment on a renewable contract basis.

A common trend in the maintenance of office equipment, particularly copiers and printers, is to organize the machine on a modular basis, wherein certain distinct subsystems of a machine are bundled together into modules which can be readily removed from machines and replaced with new modules of the same type. A modular design facilitates a great flexibility in the business relationship with the customer. By providing subsystems in discrete modules, visits from a service representative can be made very short, since all the representative has to do is remove and replace a defective module. Actual repair of the module takes place away at the service provider's premises. Further, some customers may wish to have the ability to buy modules "off the shelf," such as from an office supply store. Indeed, it is possible that a customer may lease the machine and wish to buy a succession of modules as needed. Further, the use of modules, particularly for supply units such as toner bottles, are conducive to recycling activities which are available, and occasionally mandatory, in many countries.

In order to facilitate a variety of business arrangements among manufacturers, service providers, and customers of office equipment such as copiers and printers, it is known to provide these modules with electronically-readable chips which, when the module is installed in a machine, enable the machine to both read information from the memory and also write information, such as a print count, to the module. The present invention is directed to a generalized system for information exchanges between modules and machines in an environment of printers and copiers.

DESCRIPTION OF THE PRIOR ART

U.S. Pat. No. 4,372,675 discloses an electrophotographic printer in which a microprocessor and non-volatile electronic memory is used to control power in a fuser lamp, in a manner to adapt the machine to distinct power outlets. The non-volatile memory is programmed to indicate the availability of a particular power output, and this information in the non-volatile memory is used by the processor to deliver optimal power to the fuser lamp at a given time.

U.S. Pat. No. 4,585,327 discloses an electrophotographic digital printing apparatus wherein a replaceable module includes a lug thereon. When the module is installed in the apparatus, the lug on the module presses a button which resets a counter which is internal to the apparatus.

U.S. Pat. No. 4,586,147 discloses an electrophotographic printing apparatus having a "history information providing device." The device includes a nonvolatile memory for taking out the latest failure information, such as the number of times of paper jam, and the latest maintenance information such as the total number of pages of printed paper and storing this information therein. The information thus stored in the non-volatile memory is accessed by causing the printer to print out the information stored in the non-volatile memory.

U.S. Pat. No. 4,634,258 discloses a color copying machine in which a plurality of toner supplies, each of a different color, can be called upon. There is provided a plurality of counters for counting the number of copies provided with each color toner developer container.

U.S. Pat. No. 4,751,484 discloses a digital printing apparatus with a replaceable drum unit (i.e., photoreceptor). The behavior of a solenoid within the apparatus is monitored in conjunction with a timing switch, in order to measure the time of use of the drum unit.

U.S. Pat. No. 4,774,544 discloses an electrophotographic printer in which the number of image forming operations is maintained in an EEPROM within the machine. The EEPROM is used to hold the data in case the machine is turned off.

U.S. Pat. No. 4,961,088 discloses the basic concept of using an electronically-readable memory permanently associated with a replaceable module which can be installed in a digital printer. The embodiment disclosed in this patent enables a printer to check an identification number of the module, to make sure the module is authorized to be installed in the machine, and also enables a count of prints made with the module to be retained in the memory associated with the module.

U.S. Pat. No. 5,049,898 discloses an ink-jet printhead cartridge having a memory element associated therewith. This memory element can store operational characteristics, such as a code indicating the color of ink in the printhead, or the position of the ink-jet orifices on the printhead body. A datum characterizing the amount of ink in the cartridge at any time can be periodically updated to reflect use of ink during printing and can warn the user of an impending exhaustion of ink.

U.S. Pat. No. 5,173,733 discloses an electrophotographic printing apparatus in which latent images can be formed on a plurality of pitches on a rotating photoreceptor belt. If a defect is detected in one of the pitches, the particular pitch along the circumference of the photoreceptor belt can be disabled so that the formation of images on that section is prevented.

U.S. Pat. No. 5,272,503 discloses a replaceable cartridge for an electrophotographic printer, having a memory device associated therewith. The memory device stores a value which varies as a function of the usage of the cartridge, and this varying value causes a controller in the printing apparatus to adjust a selected operating parameter in accordance with the value, thus maintaining printing quality of the printing machine.

U.S. Pat. No. 5,283,613 discloses a substantially "tamper proof" electronically-readable memory for use in a replaceable print module. A count memory associated with a replaceable module maintains a one-by-one count of prints made with the module. The memory associated with the module further includes a memory which can only be decremented, which serves as a "check" to prevent electronic manipulation of the print count memory.

U.S. Pat. No. 5,289,210 discloses an ink-jet printing apparatus wherein the printhead is equipped with a non-volatile memory which contains data representing recording characteristics of the head, and data which enables identification of whether the printhead matches the apparatus. At power-up, the printing apparatus reads the data from the printhead and identifies whether a matching printhead has been installed.

U.S. Pat. No. 5,318,370 discloses a thermal printing apparatus in which a releasable tape cassette includes two separate electronic memory areas. The first area contains a first value which is read by the printing machine, and the second area contains a second value which is placed on the cassette as a result of the first value having an algorithm applied to it. When the cassette is installed in the printing machine, the printing machine applies the algorithm to the first value and checks this against the second value. This process is followed to confirm that the cassette contains a compatible tape for the printing machine.

U.S. Pat. No. 5,428,378 discloses an ink-jet printing apparatus which is capable of determining the life of an installed printhead. The method relies on counting the number of print scans undergone by the printhead.

U.S. Pat. No. 5,491,540 discloses a printer/copier having a plurality of replaceable parts therein. Each replaceable part has a memory chip associated therewith, and, within the total apparatus, the various memory chips are connected in serial fashion by only a single wire.

U.S. Pat. No. 5,512,988 discloses an electrophotographic printing apparatus in which a replaceable cartridge is used to convey developer material to a charged photoreceptor. The cartridge is associated with a programmable memory which is programmed with a reference value reflecting a desired amount of developer material to be developed on the photoreceptor. In operation, the control system of the printer detects an actual amount of developer material developed on the photoreceptor and reads the reference value to determine if a difference exists between the detected actual amount and the reference value. In this way, the performance of the cartridge can be monitored.

U.S. Pat. No. 5,636,032 discloses a system for monitoring the supplies of marketing material within an electrophotographic or ink-jet printer. The system calculates a number of pixels being rendered in a present job and calculates an amount of marking material used to render the present job. The system also calculates a total area coverage to date for the marking material cartridge, and determines and displays an expected number of pages that the marking material cartridge can render. The system can also calculate per-page costs of the page currently being printed.

"Effectively Non-refillable Copier or Printer Cartridge" Xerox Disclosure Journal (Vol. 18, no. 2, March/April 1993) and "CRUM Activated "No Warranty" Display" Xerox Disclosure Journal (Vol. 19, no. 5, September/October 1994) disclose some prior-art concepts in electronic control of replaceable modules in a printer or copier. "Intelligent Paper Cassette," Xerox Disclosure Journal (Vol. 18, no. 5, September/October 1993, p. 519), discloses a paper-supply cassette for use in an electrophotographic printer, which has an electronic memory associated therewith. The electronic memory can hold a code which relates to the nature of the stock loaded in the cassette. The printing apparatus can read the code and adapt the behavior of the printing apparatus accordingly, such as by increasing the fuser temperature when a particularly heavy paper is loaded in the cassette.

SUMMARY OF THE INVENTION

According to one aspect of the present invention, there is provided a method of operating a printing apparatus including means for communicating a status message. A subsystem is provided in the apparatus, the subsystem being disposed in a module which is separable from the apparatus. The module has permanently associated therewith an electronically-readable memory. A use of the subsystem in the apparatus is monitored. A code relating to a maximum use of the subsystem and another code relating to a cumulative use of the subsystem are retained in the electronically-readable memory. Also retained in the electronically-readable memory is at least one service plan code. A rate of use of the subsystem per unit of time is determined. There is then determined from the rate of use of the subsystem, the maximum use of the subsystem and the cumulative use of the subsystem, a number of time units until the maximum use of the subsystem is reached. The printing apparatus determines, based on the service plan code, a threshold number of time units until the maximum use of the subsystem is reached, wherein reaching said threshold number causes the printing lo apparatus to communicate a status message.

According to another aspect of the present invention, there is provided a method of operating a printing apparatus. A subsystem is provided in the apparatus, the subsystem being disposed in a module which is separable from the apparatus, and having a permanently associated therewith an electronically-readable memory. A bottle supplying marking material is provided within the apparatus, the bottle being separable from the module. A cumulative use of the marking material is determined, and a rate of use of the marking material per unit of time is determined. A code relating to the maximum amount of marking material useable from the bottle is retained in the electronically-readable memory. A number of time units until the maximum useable amount of the marking material in the bottle is reached is determined, from the rate of use of marking material, the maximum useable amount of the marking material in the bottle, and the cumulative use of the marking material.

According to another aspect of the present invention, there is provided a module installable in a printing apparatus, the module comprising an electronically-readable memory, a charge receptor, and a corotron. A transfer efficiency code is loaded in the electronically-readable memory, the transfer efficiency code relating to a transfer efficiency of the corotron transferring marking material from the charge receptor to a print sheet.

According to another aspect of the present invention, there is provided a method of operating a printing apparatus comprising a module separable from the printing apparatus, the module including an electronically-readable memory, a charge receptor, and a corotron. The method comprises the steps of testing the module to determine a transfer efficiency of the corotron, and loading a code symbolic of the transfer efficiency into the electronically-readable memory.

According to another aspect of the present invention, there is provided a method of operating a printing apparatus, the printing apparatus comprising a module separable from the printing apparatus, the module including an to electronically-readable memory and a subsystem of the printing apparatus. The printing apparatus reads from the electronically-readable memory a machine speed code relating to a predetermined speed of operation of the subsystem. The printing apparatus is then operated consistent with the predetermined speed of operation of the subsystem.

According to another aspect of the present invention, there is provided a module installable in a printing apparatus, comprising an electronically-readable memory, and a xerographic component. There is stored in the electronically-readable memory a first set point code, the first set point code relating to an operating requirement of the xerographic component. According to another aspect of the present invention, there is provided a method of operating a printing apparatus, comprising the steps of providing a subsystem in the apparatus, the subsystem being disposed in a module which is separable from the apparatus, the module having permanently associated therewith an electronically-readable memory. There is stored in the electronically-readable memory a code relating to a date of remanufacture of the module.

According to another aspect of the present invention, there is provided a method of operating a printing apparatus, comprising the steps of providing a subsystem in the apparatus, the subsystem being disposed in a module which is separable from the apparatus, the module having permanently associated therewith an electronically-readable memory. There is stored in the electronically-readable memory a code relating to an identity of the printing apparatus.

According to another aspect of the present invention, there is provided a method of operating a printing apparatus, comprising the steps of providing a subsystem in the apparatus, the subsystem being disposed in a module which is separable from the apparatus, the module having an electronically-readable memory permanently associated therewith. An ancillary part is provided in the apparatus, the ancillary part being separate from the module. There is stored in the electronically-readable memory in the module a code relating to an installation condition of the ancillary part.

According to another aspect of the present invention, there is provided a method of operating a printing apparatus, comprising the steps of providing a subsystem in the apparatus, the subsystem being disposed in a module which is separable from the apparatus, the module having an electronically-readable memory permanently associated therewith. A fault code is derived, the fault code being symbolic of a predetermined type of malfunction in the apparatus. When a malfunction of said predetermined type occurs, the fault code is recorded in the electronically-readable memory in the module.

According to another aspect of the present invention, there is provided a module installable in a printing apparatus, comprising a rotatable charge receptor, the charge receptor having a landmark at a location along the circumference thereof, and an electronically-readable memory. A seam signature code is loaded in the electronically-readable memory, the seam signature code relating to a location of the landmark relative to the module at a particular time.

According to another aspect of the present invention, there is provided a method of operating a printing apparatus, comprising the steps of providing a module separable from the printing apparatus, the module having an electronically-readable memory associated there with an including a rotatable charge receptor, the charge receptor having a landmark at a location along a circumference thereof. A seam signature code is loaded in the electronically-readable memory, the seam signature code relating to a location of the landmark relative to the module at a particular time.

DETAILED DESCRIPTION OF THE INVENTION

Figure 1:
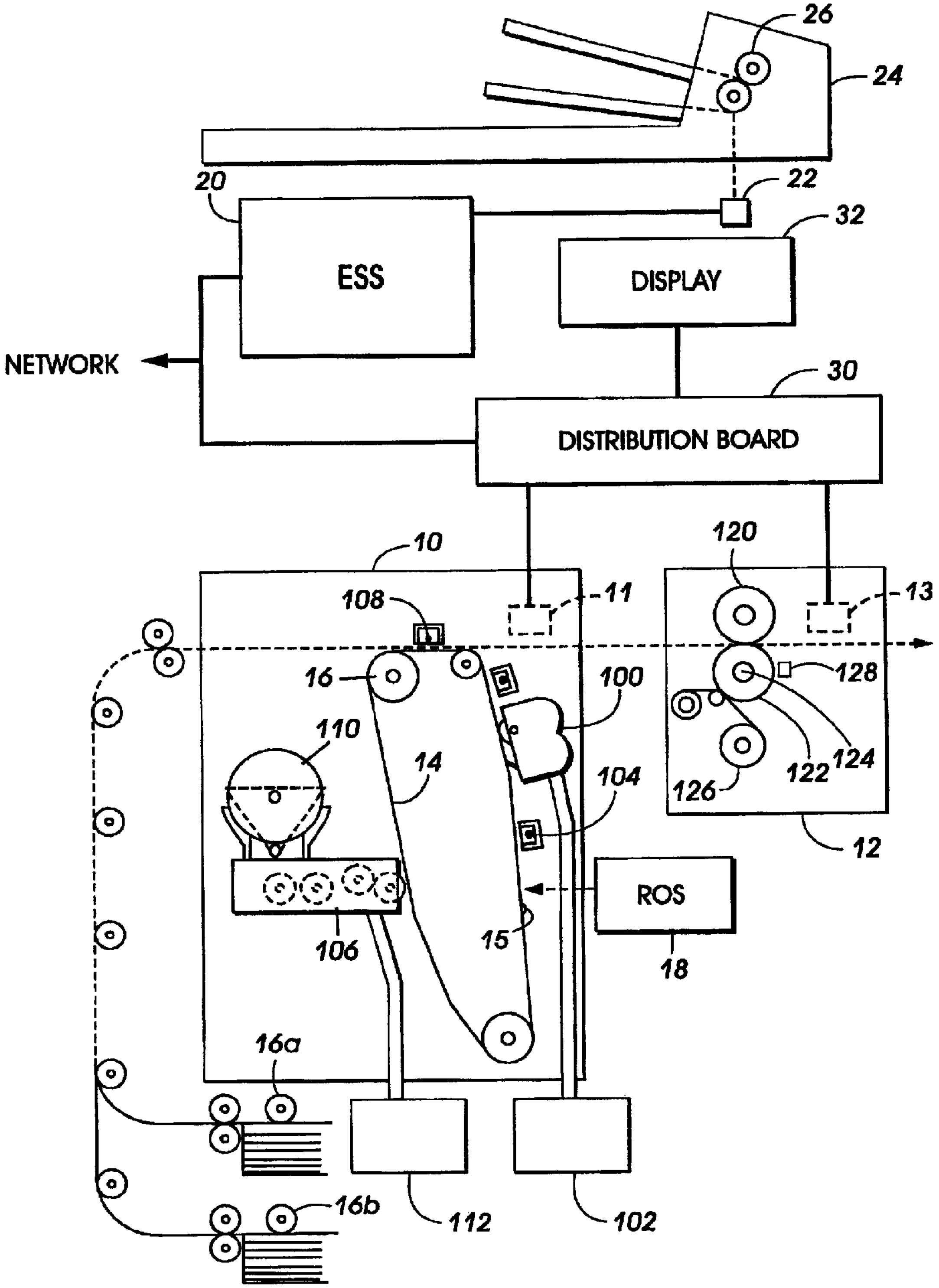
FIG. 1 is a simplified, partially-elevational, partially-schematic view of an electrophotographic printing apparatus in which the aspects of the present invention can be embodied.

FIG. 1 is a simplified partially-elevational, partially-schematic view of an electrophotographic printing apparatus (hereinafter a “machine”), in this case a combination digital copier/printer, in which many of the aspects of the present invention can be embodied. (As used in the claims herein, a “printing apparatus” can apply to any machine that outputs prints in whatever manner, such as a light-lens copier, digital printer, facsimile, or multifunction device, and can create images electrostatographically, by ink-jet, hot-melt, or by any other method.) The two main portions of hardware in the machine include a “xerographic module” indicated as 10, and a “fuser module” indicated as 12. As is familiar in the art of electrostatographic printing, there is contained within xerographic module 10 many of the essential hardware elements required to create desired images electrophotographically. The images are created on the surface of a rotating photoreceptor 14 which is mounted on a set of rollers, as shown. Disposed at various points around the circumference of photoreceptor 14 are a cleaning device generally indicated as 100, which empties into a “toner reclaim bottle” 102, a charging corotron 104 or equivalent device, a developer unit 106, and a transfer corotron 108. Of course, in any particular embodiment of an electrophotographic printer, there may be variations on this general outline, such as additional corotrons, or cleaning devices, or, in the case of a color printer, multiple developer units.

With particular reference to developer unit 106, as is familiar in the art, the unit 106 generally comprises a-housing in which a supply of developer (which typically contain toner particles plus carrier particles) which can be supplied to an electrostatic latent image created on the surface of photoreceptor 14 or other charge receptor. Developer unit 106 may be made integral with or separable from xerographic module 10; and in a color-capable embodiment of the invention, there would be provided multiple developer units 106, each unit developing the photoreceptor 14 with a different primary-color toner. A toner bottle 10, which could contain either pure toner or an admixture of carrier particles, continuously or selectably adds toner or developer into the main body of developer unit 106. In one particular embodiment of an electrophotographic printer, there is further supplied a developer receptacle here indicated as 112, which accepts excess developer directly from the housing of development unit 106. In this particular embodiment, the developer receptacle 112 should be distinguished from the toner reclaim bottle 102, which reclaims untransferred toner from cleaning device 100. Thus, in the illustrated embodiment, there are two separate receptacles for used or excess developer and toner.

Turning to fuser module 12, there is included in the present embodiment all of the essential elements of a subsystem for fusing a toner image which has been electrostatically transferred to a sheet by the xerographic module 10. As such, the fuser module 12 includes a pressure roll 120, a heat roll 122 including, at the core thereof, a heat element 124, and a web supply 126, which provides a release agent to the outer surface of heat roll 122 so that paper passing between heat roll 122 and pressure roll 120 does not stick to the heat roll 122. For purposes of the claims herein, either a heat roll or a pressure roll can be considered a "fuser roll." Also typically included in a fusing subsystem is a thermistor such as 128 for monitoring the temperature of a relevant portion of the subsystem.

Paper or other medium on which images are desired to be printed are retained on one or more paper stacks. Paper is drawn from the stacks, typically one sheet at a time, by feed rolls such as indicated as 16*a* and 16*b*. When it is desired to print an image on a sheet, a motor (not shown) activates one of the feed rolls 16*a*, 16*b*, depending on what type of sheet is desired, and the drawn sheet is taken from the stack and moved through a paper path, shown by the dot-dash line in the Figure, where it eventually comes into contact with the photoreceptor 14 within xerographic module 10. At the transfer corotron 108, the sheet receives an unfused image, as is known in the art. The sheet then passes further along the paper path through a nip formed between pressure roll 120 and heat roll 124. The fuser subsystem thus causes the toner image to be permanently fixed to the sheet, as is known in the art.

In a digital printing apparatus, whether in the form of a digital printer or in a digital copier, images are created by selectably discharging pixel-sized areas on the surface of photoreceptor 14, immediately after the surface is generally charged such as by corotron 104. Typically, this selective discharging is performed by a raster output scanner (ROS) indicated as 18, which, as is known, includes a modulating laser which reflects a beam off a rotating reflective polygon. Other apparatus for imagewise discharging of the photoreceptor 14, such as an LED bar or ionographic head, are also known. The image data operative of the ROS 18 or other apparatus typically generated by what is here called an "electronic subsystem" or ESS, here indicated as 20. (For clarity, the necessary connection between ESS 20 and ROS 18 is not shown.)

The ESS 20 can receive original image data either from a personal computer, or one of several personal computers or other apparatus on a network, or, in the case where the apparatus is being used as a digital copier, via a photosensor bar here indicated as 22. Briefly, the photosensor bar 22 typically includes a linear array of pixel-sized photosensors, on which a sequence of small areas on an original hard-copy image are focused. The photosensors in the array convert the dark and light reflected areas of the original image into electrical signals, which can be compiled and retained by ESS 20, ultimately for reproduction through ROS 18.

If the apparatus is being used in digital copier mode, it is typically desired to supply an original document handler, here generally indicated as 24, to present either or both sides of a sequence of hard-copy original pages to the photosensor bar 22. As is familiarly known, a document handler such as 24 may include any number of rollers, nudgers, etc. one of which is here indicated as 26.

According to one aspect of the present invention, there is further provided within an electrophotographic printing/copying apparatus, what is here called a "distribution board" 30. The distribution board 30 can send or receive messages, as will be described below, through the same network channels as ESS 20, or alternately through a telephone or facsimile line (not shown); alternately, the distribution board 30 can cause messages to be displayed through a display 32, typically in the form of a touch screen disposed on the exterior of the apparatus.

Distribution board 30 interacts with specially-adapted memory devices, here called "customer replaceable unit monitors," or CRUMs, which are associated with one or more customer-replaceable modules within the apparatus. In the illustrated embodiment, xerographic module 10 and fuser module 12 are each designed to be customer-replaceable; i.e., for servicing purposes, the entire module or 12 is simply removed in its entirety from the apparatus, and can then be immediately replaced by another module of the same type. As is familiar in the copier or printer industry, consumers can buy or lease individual modules as needed, and typically replace the modules without any special training. As illustrated, the xerographic module 10 has associated therewith a CRUM 11, while the fuser module 12 has associated therewith a CRUM 13. In a particular embodiment, the xerographic module 10 may further have associated therewith the toner reclaim bottle 102 and the developer receptacle 112, both of which are separable units.

The overall purpose, which will be described at length below, of each CRUM 11 and 13 is to retain information for the particular module about how that module is being used within a machine. Each CRUM 11 or 13 can be considered a small "notepad" on which certain key data is entered and retained, and also periodically updated. Thus, if a particular module 10 or 12 is removed from an apparatus, the information will stay with the module. By reading the data that is retained within a CRUM at a particular time, certain use characteristics of the CRUM can be discovered.

According to a preferred embodiment of the present invention, the CRUM 11 or 13 is basically in the form of a 2K bit serial EEPROM (electrically erasable programmable read only memory). Each CRUM 11, 13 is connected to distribution board 30 using a two-wire serial bus architecture. The non-volatile memory within the CRUM is designed for special applications requiring data storage in a ROM, PROM, and EEPROM mode. There is also preferably included in the device a special protection circuit which can be activated only one time. If this protection circuit is used, the memory content cannot be accessed regardless of the power supply or bus conditions. Each CRUM such as 11 or 13 can serve as both a transmitter and receiver in the synchronous transfer of data with distribution board 30 in accordance with a bus protocol.

The bus connecting distribution board 30 with one of the CRUMS 11 or 13 comprises two bidirectional lines, one for data signals and the other for clock signals. According to a preferred embodiment of the present invention, each data transfer, either data being sent to the CRUM or recordation therein, or being sent out of the CRUM for reading thereof, is initiated with a special "start data transfer" condition, which for example could be defined as a change in the state of the data line from high to low, while the clock is high. Each data transfer, in either direction, is terminated with a stop condition, one example of which can be a change in the state of the data line from low to high while the clock is high. The serial data passing between the distribution board 30 and a CRUM thus exists between the start condition and the stop condition; in a preferred embodiment, the number of data bytes between the two conditions is limited to 8 bytes when updating data within the CRUM, and is not limited when reading data out of the CRUM. Typically, each byte of 8 bits is followed by one acknowledge bit. This acknowledge bit is a low level put on the bus by the CRUM, whereas the distribution board receiving the data will generate an extra acknowledge-related clock pulse. U.S. Pat. No. 4,961,088, incorporated by reference above, gives a general teaching of the hardware required for reading a numerical code from a memory associated with a replaceable module in a digital printing apparatus.

With respect to the different types of data which can be stored in a CRUM such as 11 or 13 to be read or updated by distribution board 30, the following detailed descriptions of each type of data can be applied to either CRUM 11 or CRUM 13, although of course certain types of data will be particularly unique to one type of module, either the xerographic module 10 or the fuser module 12.

Service plan: This is a code placed at a location in the one-time programmable memory of the CRUM. A service plan is given a number associated with the particular arrangement that exists between the user of the machine and the manufacturer or service organization. For example, one service plan could specify that the machine is owned by the user, and the user will buy modules and other parts as they become necessary to replace. Alternately, another service plan could be a lease arrangement where it becomes the responsibility of the manufacturer or service organization to replace modules well in advance of any end-of-life of a module. In terms of data transfers between a CRUM and the distribution board 30, the identity of the service plan which is loaded by the manufacturer into the CRUM and read by the distribution board 30 at install of the module will affect what information is displayed through distribution board 30, and in what manner. For example, a "lease" arrangement (symbolized by a particular service plan code in the CRUM) could instruct the distribution board 30 to send a request to re-order new modules through the network or over a phone line to the manufacturer, in a manner which is invisible to the user; in contrast, under a "ownership " arrangement (symbolized by a different service plan code in the CRUM), where it is the responsibility of the user to obtain new modules, an indication that a module needs to be replaced will instead be displayed on display 32. Similarly, if some sort of unauthorized module is placed in the machine, that is a module in which the "service plan" code is not recognized by the distribution board 30, then distribution board 30 can cause a warning to be displayed on display 32 that, for example, a warranty is in danger of being voided.

Market region: This is another code, placed by the manufacturer in a predetermined address in the CRUM memory, which identifies the module as belonging to a particular market region, such as a geographical region. For various reasons it may be desirable that the geographic regions of the module and the complete apparatus be the same: for instance, a European machine is designed for 220 volts, while a US machine is designed for 10 volts, and to place a wrong type of module in a machine could be catastrophic. Thus, within an initialization procedure, the distribution board 30 reads a code describing a market region stored in the CRUM memory for a confirmation that the market region of both the modules and the machine match.

Print count: This is the number of prints which have been created by a particular module. This number is derived by having the distribution board 30 first read the current value of this print count from the CRUM memory, and subtract from (or add to) this number every time the ESS 20 causes a print to be output. Periodically, such as every five minutes or after every predetermined amount of time in which the machine is not outputting prints, the value of the print count is updated in the CRUM memory.

Maximum print volume value: This is a number, entered into a predetermined location in the CRUM memory at manufacture or remanufacture of the module, which states the maximum rated number for prints the particular module is designed to output before replacement. This maximum print volume will of course be compared with the current print count, and when the print count reaches a certain range relative to the maximum print volume, the distribution board 30 can (depending on the service plan) display a particular message on display 32 and/or place a "reorder" notice over the network or phone line to the manufacturer or supplier, indicating that the module will soon need replacement.

The maximum print volume code can further relate to a service plan selected by the user. For example, if a user prefers a long life of a module over print quality, a relatively high maximum print volume can be written into the CRUM, even if that means the later prints may not be of optimal quality; conversely, a user with high quality requirements may desire a service plan with relatively low maximum print volume so that optimal print quality can be guaranteed for all prints. Such differences in desired service plans can be manifest in a service plan code and/or the maximum print volume code; a particular service plan code in a CRUM such as 11 may even signal the print-quality algorithms in the machine to be more or less tolerant of less-than-optimal print quality, depending on user desires.

Print count security: This is a number, placed in one-time programmable memory within the CRUM memory, which acts as a "check" to the CRU print count. In a typical embodiment, after every 15,000 (or other number) prints counted by the print count, the number in print count security is changed, typically by changing one bit in the print count security memory from 1 to 0 or vice versa. An important feature of the print count security value is that, because it is in one-time programmable memory, it cannot be tampered with by someone trying to artificially extend the useful life of the module. A fuller description of the principle of using a print count security feature is given in U.S. Pat. No. 5,283,613.

Pixel usage: This is a number, periodically updated through the distribution board 30, which represents the total cumulative usage of the particular module in terms of the number of pixels, or only print-black pixels, which have been printed by the module. The cumulative number of pixels can be used as an important parameter for judging the overall use of the particular module. A relatively high number of black pixels, for example, would indicate a relatively high toner coverage of sheets passing through a particular module, and is a strong indication of how much physical wear is being experienced by the module. Similarly, the cumulative pixel usage can be compared with a simultaneous print count in a particular CRUM memory at a particular time, and a number of pixels (or just black pixels) per individual print can be readily determined. (The pixel coverage per print can also be normalized taking into account different sheet sizes.) The raw data by which pixel usage is determined can be derived either from the image data output by the ESS 20, or more directly could be derived by simply monitoring the behavior of the ROS 18 over time. For example, the relative amount of time a laser in ROS 18 is on or off when printing a sheet-sized image can be readily used as an indication of how much black-area coverage exists on a every sheet.

U.S. Pat. No. 5,636,032, incorporated by reference above, gives a general teaching of pixel-counting techniques useful for determining a consumption rate of marking material. Of course, in a color-capable embodiment of the invention, where there would be a separate developer unit 106 for each primary color toner, the "black" pixel usage calcluation could be performed and recorded with respect to each color separation generated by the machine.

Maximum pixel usage value: This is a number placed in one-time programmable memory at manufacture or remanufacture of the module, which indicates a maximum rated value of number of pixels, or black pixels, which could be output by the module. Once again, as with print count, the pixel usage stored in the CRUM memory is periodically compared with the maximum pixel usage, and once the pixel usage count reaches a certain range relative to the maximum pixel usage value, the distribution board 30 can either display a message on display 32 and/or notify a manufacturer or service representative through the network or phone line. It is also possible to provide a system which retains the average daily pixel count, once again by dividing the pixel usage by a number of days, and this number may also be useful in servicing or remanufacture.

Machine average daily print volume: This is a number stored at a predetermined location within the CRUM memory, which represents the number of prints that have been made with the module divided by a certain number of days. The specific technique by which this number is derived and daily updated by distribution board 30 can be approached in a number of ways. For example, with every daily update, the distribution board 30 can maintain a ten-day moving average of prints per day. Alternately, if a remote service organization accessing the distribution board over the network systematically polls the machine on a periodic basis, such as every three days, the number can be derived by counting the number of prints since the last remote polling, and this number can be divided by the number of days since the last polling. This number can be particularly valuable when the module is being serviced or remanufactured, because it can be an indication of the overall stress that takes place on a daily basis on the module.

In a preferred embodiment of the invention, there are provided at least four status messages at which a machine will display or otherwise communicate the approach of a need to replace a module. These status messages are determined by the machine extrapolating the average daily print volume, and when a particular threshold number of days to module replacement is reached, an appropriate status message is communicated by the machine, either to the end user through the display 32 or directly to the service provider over a network. For example, the machine can communicate a "reorder module" message at some point between 10 and 25 days (the exact day being set by user preference, or as a result of particular service plan code) before the expected end of life of the module; a "prepare to replace" message at some point between 2 and 5 days; a "replace today" message at 1–2 days; and finally a "hard stop" message when the module runs out. The particular service plan code stored in the CRUM, mentioned above, can signal to the apparatus at what predetermined threshold number of days (such as between 10 and 25 days) a particular status message should be communicated (either through the network or through the display) to the user.

The service plan code can also include data symbolic of an instruction to communicate a particular status message over the network (in the case of, for example, a leased machine), or through display 32 (in the case of for example, a user-owned machine or a stand-alone copier), or both. Of course, depending on a particular design, certain types of messages can be displayed and other types of messages can be transmitted over the network, and how any message is communicated can be determined by the service plan code.

Machine speed code: In a product family, a design option is to provide essentially the same hardware across different-speed products, e.g., the same basic machine, including the same basic design of replaceable modules, can be sold in either a 40 ppm (page-per-minute) or 60 ppm version. According to one aspect of the present invention, a code relating to whether a module such as 10 or 12 is suitable for use at a particular speed (or both speeds) is retained in the associated CRUM 11 or 13. A machine design option is to program the machine to operate only at a maximum speed "authorized" by the machine speed code in the CRUM, so that, for example, if a 40 ppm module is installed in a machine with a "top speed" of 60 ppm, the machine reading the machine speed code of 40 ppm will be constrained to operate only at 40 ppm, such as by operating stepper motors in the machine at a special, lower frequency.

Ancillary part code: In one practical embodiment of the present invention, a xerographic module such as when shipped to the customer is bundled with a number of feed rolls such as shown in FIG. 1 as 16*a* or 16*b*. Although in this particular embodiment feed rolls are at issue, the general concept here can be applied to any part within the apparatus which is not part of a module, but which nonetheless should be periodically replaced by the user. Another possible candidates for occasional replacement would be, for example, the roller 26 or other part associated with the automatic document handler 24.

The overall intention is that an ancillary replaceable part which is not directly part of the module can still rely on a CRUM within a particular module to remind the user (through display 32) and/or instruct the manufacturer (by distribution board 30 communicating to the manufacturer or service organization through the network) that a particular part is due to be replaced. In the case where it is the user's responsibility to replace the feed roll 16*a* or 16*b*, typically the distribution board 30 will have a protocol in which the user is requested to enter in via the display a confirmation that he has indeed replaced a particular feed roll. Other possible ancillary parts include the the toner bottle 110, toner reclaim bottle 102 or the used developer receptacle 112, which typically do not have CRUMs directly associated therewith. Depending on the particular ancillary part that has to be replaced in addition to the module, the presence of such a feature will be adapted accordingly depending on how often the particular part must be replaced relative to the rate of replacement of the module having the CRUM.

In one currently-preferred embodiment of the invention, a particular code in the CRUM is used to retain a value related to a number of feed rolls which were shipped with the whole module. However, more generally, such a code in the CRUM can store information about an "installation condition" of the ancillary part: for instance the code can relate to whether the ancillary part was installed substantally simultaneously with the module, or to the date the ancillary part was installed in the apparatus.

The high level of detail in machine and module performance afforded by CRUM systems of the present invention facilitates sophisticated relationships between the customer and the manufacturer or other service organization. For example, toner bottle 110, which as mentioned above can contain either pure toner or toner with an admixture of carrier particles, is typically replaced relatively often by a customer, typically ten replacements of a toner bottle 110 relative to each replacement of a module 10. Similarly, the developer receptacle 112 and toner reclaim bottle 102 occasionally fill and similarly must be emptied and/or replaced by the user. With the features of the present invention, those parts which are replaced fairly often by a relatively untrained user can be monitored without the expense of, for example, placing sensors within the parts, which is a common practice. For example, because the distribution board 30 is capable of determining values of average print count per day and average pixel count per day, the system is capable of extrapolating how many days in the future the toner bottle 110 will run out or toner reclaim bottle 102 or developer receptacle 112 will fill.

In the case of toner bottle 110, once an amount of toner (or, in the general case, any marking material such as liquid ink) consumption per day is established, and if the cumulative daily consumption and original volume of toner in bottle 110 is known, the machine can predict when the toner bottle 110 will be empty, based on the same criteria used to determine the expected replacement date of the xerographic module 10: the maximum usable amount of toner in toner bottle 110, the cumulative use of toner from toner bottle 110, and the calculated rate of toner usage per day. (One or all of the numbers relating to the amount of toner and the usage thereof can be retained in CRUM 11, or else in a memory within the machine itself.) This information facilitates a system where the distribution board 30 can display, a predetermined number of days in advance, that the toner bottle will need replacement. In the case where orders for new toner bottles are made directly by distribution board 30 over a network to the service organization, the machine can be programmed to place the order for a new toner bottle two or three days in advance of expected run out, so that a new toner bottle 110 can be mailed to the customer. The same principle will apply to the emptying and/or replacing of developer receptacle 112.

In the case of toner reclaim bottle 102, the rate at which the receptacle is filled will depend not only on the amount of coverage of images created by ROS 18, but also on the transfer efficiency of the transfer corotron 108: If the transfer efficiency is relatively low, a relatively large amount of toner will remain on the surface of photoreceptor 14 even after the transfer step, and this untransferred toner will end up in toner reclaim bottle 102. Thus, according to one aspect of the present invention, the expected fill-up point of toner reclaim bottle 102 is determined by an average number of pixels per day and a measured transfer efficiency of the module 10.

In order to obtain this value of transfer efficiency, one technique is to have the module 10 tested at manufacture or remanufacture and a transfer efficiency code relating to the actual transfer efficiency written into the CRUM 11. In this way, at install, the distribution board 30 can simply read out the transfer efficiency of the particular module 10, and use that number in calculations of the expected fill-up time, in days, of toner reclaim bottle 102.

Module serial number, module date of manufacture or remanufacture, list of machine serial numbers: These numbers are either entered into a predetermined location in the CRUM by the manufacturer, or, in the case of the machine serial number, entered into the CRUM by the machine itself, via distribution board 30, at install. This information is always useful when the module is being remanufactured or serviced, and the machine itself may have a use for knowing the module serial number and date of manufacture. For example, the distribution board 30 may be programmed to recognize that a module manufactured before a certain date will lack certain updated features, and can operate the module accordingly. Maintaining a list of the serial numbers of all machines in which the module has been installed in its lifetime may be useful in determining whether a particular machine is acting on a particular module in an undesirable manner. (With regard to the claims herein, the original manufacture of a module can count as a "remanufacture" for dating purposes.)

Set point data: The CRUM such as 11 can have loaded at certain predetermined locations in the memory therein, numbers or other codes which directly relate to specific operating requirements of various components within xerographic module 10. For instance, the charge corotron 104, the development unit 106, and transfer corotron 108, along with any other electrical structure within the module 10, may each need to be biased to a very specific potential in order for the machine to operate optimally. In a more sophisticated variation, any or all of the various components to be biased may optimally be biased according to a specific function which may relate to one or more external variables such as, for example, temperature, humidity, and current toner level in the development unit. (In the claims herein, a "xerographic component" shall include any electric device or electronic component, such as charge corotron 104, development unit 106, or transfer corotron 108, which operates to change a potential on a charge receptor such as photoreceptor 14.)

Thus, according to one aspect of the present invention, there can be stored at predetermined locations within the memory of CRUM 11 "set point codes" (either absolute numbers, or special codes which relate to absolute numbers) of how much each individual xerographic component within the module 10 should be biased by the machine (or, some other relevant operating characteristic of the xerographic component, such as AC frequency). Alternately, the set point codes could indicate one of a selectable set of functions, such as look-up tables, which represent functions by which the optimal bias of different components should be calculated.

Further, the CRUM 11 or 13 could contain or retain information useful in calibrating on-board sensors such as thermistors or electrostatic voltmeters: the calibration could be done at manufacture or remanufacture, and the results of the calibration (i.e., the tested resistance of a thermistor as a function of temperature at certain test points, or an offset value for a voltmeter) could be loaded into the CRUM just before delivery of the module to the customer.

Further, with reference to set points, it may be desirable to provide a system in which a module 10 of a single basic design can be installed in machines which operate at different speeds, such as 40 ppm or 60 ppm. It is likely that a particular component in a module which is installed in a 40 ppm machine will have different voltage, power, and/or frequency requirements than if the module were installed in a 60 ppm machine. A similar system can be provided to retain in the CRUM 11 or 13 one set of power and voltage requirements if the module is installed in a monochrome machine, and another set of requirements for when the module is installed in a color-capable machine. According to one variation of the present invention, different sets of set points can be stored in different predetermined locations in memory, and the machine will access those addresses in memory depending on whether the machine is rated at one speed or capability or the other. In this way, a module of a single basic design can be installed and function successfully in machines rated at different speeds.

Seam signature: This is a feature unique to the CRUM 11 associated with the xerographic module 10. In one particular embodiment of the invention, a belt type photoreceptor such as 14 in FIG. 1 has a seam where an image should not be created. It is therefore desirable that one should know the location of the seam or other "landmark" around the circumference of photoreceptor belt 14 if the module 10 is removed from a machine. Such a seam or other landmark is indicated in the Figure as 15. It is useful to remember the location of the seam 15 for the benefit for a subsequent machine in which the module 10 is installed, so that the subsequent machine will not accidentally cause an image to be placed over the seam. There are many possible ways in which the distribution board 30 can determine the location of the seam 15 in belt 14 at a given time, so that it may relay this information to the CRUM memory just before the module is removed. One possible technique is to provide encoder marks (not shown) which can be read by various photosensitive devices distributed on the circumference of photoreceptor belt 14 in a manner known in the art. Another technique is simply to have the distribution board maintain a running count of the different types of images that have been printed with the module 10 since the last time the location of the seam 15 was determined (e.g., when the module 10 was first installed into the machine, and the seam location was read).

Storage of a seam signature code in the CRUM 11 can also be used in a system in which the CRUM 11 retains data relating to "disabled pitches" along the photoreceptor belt. For example, U.S. Pat. No. 5,173,733 discloses an electrophotographic printing apparatus in which latent images can be formed on a plurality of pitches on a rotating photoreceptor belt. If a defect is detected in one of the pitches, the particular pitch along the circumference of the photoreceptor belt can be disabled so that the formation of images on that section is prevented. With the present invention, by using the seam signature code in the CRUM 11, the location relative to the seam 15 of such a disabled pitch along the photoreceptor belt can be retained by a disabled-pitch code in the CRUM as well, so that the disabled pitch can be quickly identified by service personnel servicing the module, or, alternately, so the pitch will continue to be disabled if the module 10 is installed in another machine.

Component failure/ fault code: This is a space within the CRUM memory where fault codes, each code being associated with a particular type of hardware failure or other malfunction within the machine, can be recorded, along with the date and time of the failure, in a predetermined memory location in the CRUM of a particular module. Such information is noted by the distribution board or other control system within the machine in a manner familiar in the art. This information is useful when the module is disinstalled and remanufactured.

Fuser power and voltage requirements: This is a number, unique to the CRUM 13 in fuser module 12, which is loaded into the CRUM memory at manufacture where numbers relating to the voltage and power requirements required to operate the particular fusing subsystem in module 12. Upon the install of module 12, distribution board 30 reads these requirements from the CRUM 13, and then is capable of sending the desired voltage and power levels to the fuser subsystem. This feature is important, for example, because successive generations of fusing subsystems may require different voltage and power levels, and it is useful to be able to take advantage of lower requirements afforded by newer module designs.

An important variation is to provide a system whereby the CRUM 13 provides to the machine different requirements depending on the rated output speed of the machine, such as either 60 ppm or 40 ppm. The speed rating of the particular machine may have an effect on the power requirements to the fusing subsystem, and thus the CRUM 13 will provide different answers to different power requirements depending on the speed of the machine it is installed in. The CRUM 13 can retain the requirements for one speed at one address in memory, and the requirements for the other speed at another address, and the machine will read out of one memory address or the other depending on its speed. In this way, the same basic fusing module 12 can be installed in machines of different rated speeds, and the CRUM 13 will "request" particular wattage and voltage accordingly. The same principle can be applied so that the CRUM 13 can retain different requirements at different memory locations for either a monochrome or a color-capable machine.

Another variation on this principle is to provide at a predetermined memory location in CRUM 13 numbers representative of temperature requirements or upper or lower temperature limits, as opposed to electricity requirements, for the fuser subsystem (in such a case, for instance, if an upper temperature limit is reached, a safety problem can result and the apparatus may simply shut itself off). If the apparatus includes temperature-sensing devices, the machine can provide suitable power and voltage to obtain the desired temperature as sensed by the device. Once again, different speed or type machines (or the use of different materials as print sheets, such as heavy stock or transparencies) may require different fuser temperatures, and so the different numbers can be stored at different memory locations.

Further with reference to CRUM 13, there may be provided at a predetermined location in memory a code useful for calibration of a thermistor such as 128. For instance, a thermistor will have associated therewith an offset voltage which can be interpreted as a certain absolute temperature, and/or there may be a particular slope of a function relating output voltage to temperature. The CRUM 13 can retain codes symbolic of the offset and/or the slope (the slope and offset are referred to in the claims generally as "calibration parameters"). These codes can be loaded into CRUM 13 at manufacture or remanufacture based on a direct test of the thermistor in a particular module. This is also useful in cases where a new design of a thermistor is incorporated in a new fuser module 12: by loading the offset and slope into CRUM 13, a new design fuser module can be readily installed in a relatively old machine Web usage: This is a requirement of fusing module 12. This is a number stored in the CRUM 13 and periodically updated by distribution board 30, reflective of the cumulative amount of use, either in terms of length or number of prints made, of fuser cleaning web 126 within the fuser module. Also preferably retained in CRUM 13 is a code symbolic of a maximum use, either in terms of web length or number of prints, that can be made with the web 126. Once again, as with other consumables, the usage per unit time of web 126 can be determined and compared with the maximum use to predict a replacement time. After a predetermined amount of web 126 has been consumed, the distribution board 30 can communicate either through display 32 or over the network that the web 126, or the module 12 as a whole, should be replaced within a certain calculated amount of time.

The usage of the web 126 can be measured in any manner familiar in the art, such as by associating a counter with a stepper motor or other mechanism (not shown) which moves web 126; or, alternately, the usage of web 126 can be inferred from a number of prints made by the apparatus since the last install of a fuser module 12. The CRUM 13 can also retain at a predetermined location therein a code symbolic of the length of web 126 provided at install of a particular module 12; in this way, alternate designs of fuser module 12 (such as a "long-life" web 126 of a particularly long length, or a low-cost module with a relatively short web 126) can be taken into account. Further, CRUM 13 can retain at a predetermined location therein a code symbolic of a desired web speed for web 126, which would be manifest in, for example, the frequency of signals sent to a stepper motor which moves web 126; in this way, a module 12 having a new design web 126, which may not require as fast a motion for effective cleaning as a previous design, can be installed.

While the invention has been described with reference to the structure disclosed, it is not confined to the details set forth, but is intended to cover such modifications or changes as may come within the scope of the following claims.

What is claimed is:

1. A method of operating a printing apparatus, the printing apparatus including means for communicating a status message over a network, comprising the steps of:

providing a subsystem in the apparatus, the subsystem being disposed in a module which is separable from the apparatus, the module including an electronically-readable memory;

retaining in the electronically-readable memory at least one service plan code, the service plan code being symbolic of a type of business relationship between a user of the apparatus and a supplier of a module;

reading from the electronically-readable memory the service plan code; and communicating a message to the supplier over a network, only if the business relationship symbolized in the service plan code is of a predetermined type.

2. The method of claim 1, further comprising the step of if the business relationship symbolized in the service plan code is not of the predetermined type, communicating the message only through a user interface at the printing apparatus.

3. The method of claim 1, further comprising the steps of monitoring a use of the subsystem in the apparatus; and determining, based on the monitored use of the apparatus, that the subsystem should be replaced;

the message relating to whether the module should be replaced.

4. A module installable in a printing apparatus, the printing including means for communicating a status message over a network, comprising:

a subsystem usable in the printing apparatus;

an electronically-readable memory;

at least one service plan code retained in the memory, the service plan code being symbolic of a type of business relationship between a user of the apparatus and a supplier of a module, the printing apparatus communicating a message to the supplier over a network only if the business relationship symbolized in the service plan code is of a predetermined type.

5. The module of claim 4, wherein the message relates to whether in the module needs to be replaced.

6. A method of operating a printing apparatus, the printing apparatus including means for communicating a status message over a network, comprising the steps of:

providing a subsystem in the apparatus, the subsystem being disposed in a module which is separable from the apparatus, the module including an electronically-readable memory;

retaining in the electronically-readable memory at least one service plan code;

monitoring a use of the subsystem in the apparatus;

reading from the electronically-readable memory the service plan code;

determining, based on the monitored use of the apparatus, that the subsystem should be replaced at an extrapolated time in the future;

determining, based on reading the service plan code, a threshold when a status message is communicated by the printing apparatus, the threshold being a predetermined amount of time before the extrapolated time that the subsystem should be replaced.

7. The method of claim 6, the subsystem including a charge receptor for retaining electrostatographic images.

8. The method of claim 6, the subsystem including a device for developing electrostatographic images.

9. The method of claim 6, the subsystem including at least a portion of a fusing device.

10. A module installable in a printing apparatus, the printing apparatus being capable of monitoring a use of a subsystem in the apparatus and determining that the subsystem should be replaced at an extrapolated time in the future, comprising:

a subsystem usable in the apparatus;

an electronically-readable memory, the electronically-readable memory retaining at least one service plan code;

the printing apparatus determining, based on reading the service plan code, a threshold when a status message is communicated by the printing apparatus, the threshold being a predetermined amount of time before the extrapolated time that the subsystem should be replaced.

11. The method of claim 10, the subsystem including a charge receptor for retaining electrostatographic images.

12. The method of claim 10, the subsystem including a device for developing electrostatographic images.

13. The method of claim 10, the subsystem including at least a portion of a fusing device.

14. A module installable in an electrostatographic printing apparatus, comprising:

a charge receptor for retaining electrostatic latent images;

an electronically-readable memory; and a code placed at a predetermined location in the memory, the code being symbolic of a transfer efficiency of a process by which marking material is transferred from the charge receptor to a print sheet, whereby the electrostatographic printing apparatus can read the code from the memory and use the code in a calculation relating to a use of marking material when outputting prints.

15. The module of claim 14, wherein the calculation relates to creating waste marking material as a result of an electrostatographic printing process.

16. The module of claim 15, wherein the calculation relates to filling a receptacle for waste marking material.

17. A method of operating an electrostatographic printing apparatus, comprising the step of:

installing a module in the apparatus, the module including a charge receptor for retaining electrostatic latent images, and an electronically-readable memory;

reading a code placed at a predetermined location in the memory, the code being symbolic of a transfer efficiency of a process by which marking material is transferred from the charge receptor to a print sheet; and using the code in a calculation relating to a use of marking material when the apparatus is outputting prints.

18. The method of claim 17, wherein the calculation relates to creating waste marking material as a result of a printing process.

19. The method of claim 18, wherein the calculation relates to filling a receptacle for waste marking material.

20. A method of providing a module installable in an electrostatographic printing apparatus, the module including a charge receptor for retaining electrostatic latent images, and an electronically-readable memory, comprising the steps of:

testing the module to determine a transfer efficiency of a process by which marking material is transferred from the charge receptor to a print sheet; and placing a code in the memory, the code being symbolic of the transfer efficiency, whereby the printing apparatus can read the code and use the code in a calculation relating to a use of marking material when the apparatus is outputting prints.

21. The method of claim 20, wherein the calculation relates to creating waste marking material as a result of a printing process.

22. The method of claim 21, wherein the calculation relates to filling a receptacle for waste marking material.

* * * * *